A. GRAMLING.
SAFETY TRANSPORT DEVICE FOR MOUNTAIN RAILWAYS.
APPLICATION FILED NOV. 18, 1911.
1,062,454.  
Patented May 20, 1913.
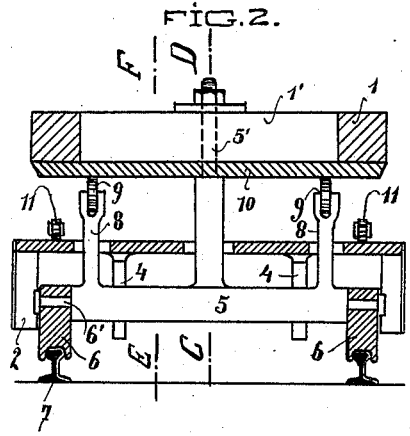
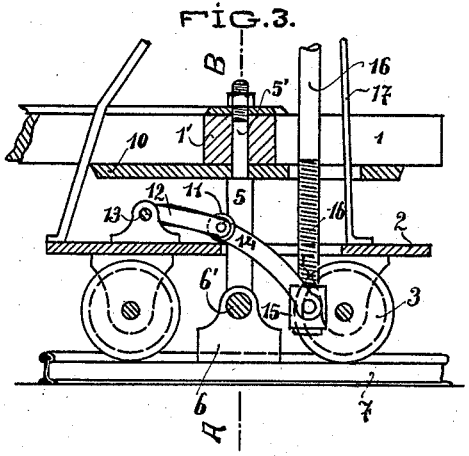
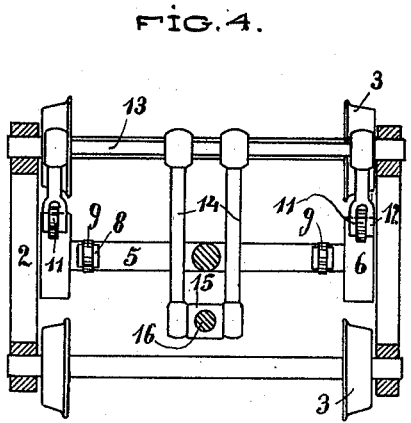
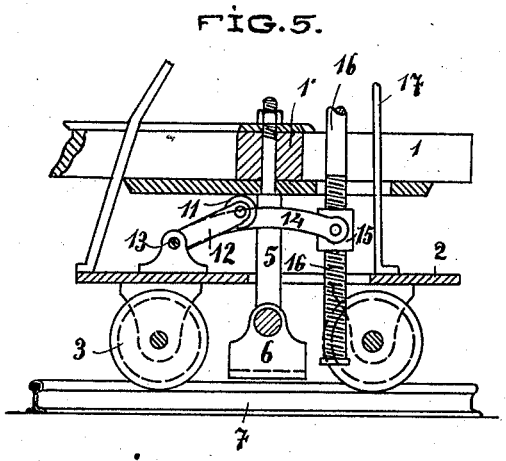
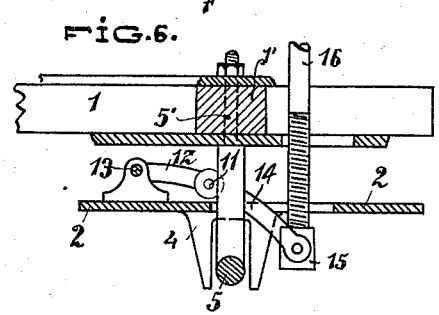
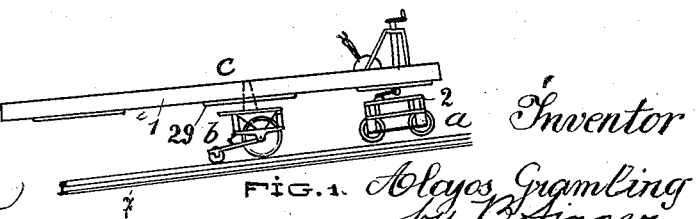

UNITED STATES PATENT OFFICE.

ALAJOS GRAMLING, OF BOROSSEBES, AUSTRIA-HUNGARY.

SAFETY TRANSPORT DEVICE FOR MOUNTAIN-RAILWAYS.

1,062,454.  Specification of Letters Patent.  Patented May 20, 1913.

Application filed November 18, 1911. Serial No. 661,139.

*To all whom it may concern:*

Be it known that I, ALAJOS GRAMLING, a subject of the Hungarian King, and resident of Borossebes, Austria-Hungary, have invented certain new and useful Improvements in Safety Transport Devices for Mountain-Railways.

This invention relates to improvements in cars for light mountain railways intended for haulage of timber and the like purposes.

It has for its object the construction of the trucks in such a way that transport takes place in a rapid and yet safe manner, while the danger of brake failure and derailment of the trucks is practically eliminated. Further, in up-hill travel of the empty cars, only the minimum of power is used.

The invention will now be described with reference to the accompanying drawings, in which, Figure 1 is a side view of a car traveling up hill. Fig. 2 is a vertical section of the rear truck taken through line A—B of Fig. 3. Fig. 3 is a section through line C—D of Fig. 2. Fig. 4 is a part sectional plan of Fig. 2. Fig. 5 is a section of the rear truck similar to Fig. 3 with the parts in a different position. Fig. 6 shows a constructional detail in section taken through line E—F of Fig. 2.

The improved car consists of two four wheeled trucks $a$ and $b$, rotatably connected by means of vertical axles to a frame work chassis $c$ constructed from beams or girders 1 and 1' which act as supports for the load. Said truck $a$ is provided with an improved brake attachment which exerts the required braking effect when needed. The truck $a$ which when traveling down hill is the rear truck, is provided with brake shoes adapted to engage the rails, and to which the pressure of the weight of the load may be applied.

The truck $a$ consists of a platform 2 resting on four wheels 3. To the underside of said platform are secured guide forks 4 (Fig. 6) encompassing the horizontal arms of a T-shaped bearer piece 5 (Fig. 2), said arms carrying at their ends brake shoes 6 pivoted at 6' and adapted to engage the rails 7. The upright arm 5' of T-shaped piece 5 is rotatably secured to beam 1' suitably recessed to receive the same, said arm 5' acting as a pivot for the truck $a$. Forming part of the bearer piece 5 are upright arms 8 carrying, pivoted in their forked extremities, rollers 9, supporting a plate 10 constituting the underside of the rear end of chassis $c$. The bearer piece 5 is movable in the guides 4 hence the truck 2 is movable in a vertical sense relative to the bearer piece 5. By the side of the truck 2 and adapted to engage the plate 10 are a second pair of rollers 11 pivoted to arms 12 secured to a shaft 13 journaled in bearings on said truck 2. Fixed to said shaft 13 are levers 14 pivoted at their free ends to a block 15 cored and threaded to receive a screw spindle 16. The spindle 16 is rotatively supported in a guide frame 17 and is provided with a hand wheel for turning (see Fig. 1). Hence when the spindle 16 is rotated the block 15 is moved up or down at will, and when moved up the rollers 11 are raised adjacent the plate 10, thereby raising and supporting the chassis $c$. It will thus be understood that the distance between the chassis and the truck 2, that is the distance between the chassis and the rails, may be altered, which means that the load may be supported either on the brake shoes, as shown in Figs. 2 and 3, or on the wheels 3 as shown in Fig. 5. The force exerted on the brake shoes 6 by the weight of the load when said brake shoes are supporting such load is however transmitted to the brake shoe through rollers 9 and not through the upright 5', which arrangement gives the best results with the minimum of friction.

When traveling up hill with the truck empty the truck $b$ is moved to the plate 29 in order to use only the minimum of power for haulage. In this position the truck $a$ is raised off the rails (see Fig. 1) as the truck $b$ is built higher than truck $a$, and the chassis $c$ is balanced on the wheel axle 22' so that the weight of said chassis is supported only on wheels 22, while the wheels 23 prevent derailment of the truck.

The operation of the invention is as follows:—On level ground the truck is supported on sets of wheels 3, 22 and 23. On a steep incline the weight of the load is applied to the brake shoes 6 through manipulating the hand wheel 18 whereby a brake power is exerted proportional to the load. Returning empty up hill the truck $b$ is moved to the center of the chassis as described and as shown in Fig. 1.

Having now particularly described and ascertained the nature of my said invention, and in what manner the same is to be performed, I declare that what I claim is:—

1. A hauling car comprising in combination, a car frame, a main truck therefor comprising running wheels and a truck frame, levers pivoted on said truck frame, brake shoes for engaging the rails, a brake shoe frame guided by said truck and pivotally connected in supporting relation with said car frame, and means carried by said truck for engaging said levers with said car frame to support the latter on said truck or disengaging said levers therefrom to throw the weight of the car frame onto said brake frame, substantially as described.

2. A hauling car for inclined railways comprising in combination, a car frame, a truck therefor, brake shoes for engaging the rails, a brake shoe frame supportingly connected with said car frame, devices carried by the truck for holding said brake shoe frame to a straight up and down adjusted movement, and mechanism for throwing the weight of the car frame either onto said truck or onto said brake shoe frame, substantially as described.

3. A hauling car for inclined railways comprising in combination, a car frame, a truck therefor, brake shoes for engaging the rails, a brake shoe frame supportingly connected with said car frame, devices carried by said truck for guiding said brake shoe frame, and mechanism movable in one direction for raising the brake shoes and disposing the weight of the car frame on said truck or movable in another direction for lowering the brake shoes upon the rails and throwing the weight of the car frame on said brake frame, substantially as described.

In testimony whereof I have hereunto set my hand in presence of two witnesses.

ALAJOS GRAMLING.

Witnesses:
 MOLNÓR R. BETA,
 ROULO TANOS.

Copies of this patent may be obtained for five cents each, by addressing the " Commissioner of Patents, Washington, D. C."